US012696151B2

(12) United States Patent
Abtin et al.

(10) Patent No.: US 12,696,151 B2
(45) Date of Patent: Jul. 28, 2026

(54) NETWORK NODES, AND METHODS PERFORMED IN A WIRELESS COMMUNICATION NETWORK

(71) Applicant: Telefonaktiebolaget LM Ericsson (publ), Stockholm (SE)

(72) Inventors: Afshin Abtin, Sollentuna (SE); Christer Gustafsson, Huddinge (SE); Ralf Keller, Würselen (DE); Ann-Christine Sander, Skepplanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 480 days.

(21) Appl. No.: 18/019,841

(22) PCT Filed: Aug. 5, 2020

(86) PCT No.: PCT/EP2020/071969
§ 371 (c)(1),
(2) Date: Feb. 6, 2023

(87) PCT Pub. No.: WO2022/028685
PCT Pub. Date: Feb. 10, 2022

(65) Prior Publication Data
US 2023/0284108 A1     Sep. 7, 2023

(51) Int. Cl.
*H04W 36/00*          (2009.01)
*H04W 36/14*          (2009.01)
(Continued)

(52) U.S. Cl.
CPC . *H04W 36/00837* (2018.08); *H04W 36/0033* (2013.01); *H04W 36/1443* (2023.05); *H04W 48/04* (2013.01); *H04W 84/042* (2013.01)

(58) Field of Classification Search
CPC ....... H04W 36/00837; H04W 36/0033; H04W 36/1443; H04W 48/04; H04W 84/042; H04W 48/02
See application file for complete search history.

(56) References Cited

U.S. PATENT DOCUMENTS

| | | | | |
|---|---|---|---|---|
| 2010/0323662 A1* | 12/2010 | Dahlen | ................. | H04W 48/02 455/410 |
| 2015/0113595 A1* | 4/2015 | Wu | ........................ | H04W 48/18 726/3 |

(Continued)

FOREIGN PATENT DOCUMENTS

KR          102002155 B1     7/2019

OTHER PUBLICATIONS

International Search Report and Written Opinion of the International Searching Authority, PCT/EP2020/071969, mailed Jun. 18, 2021, 16 pages.

(Continued)

*Primary Examiner* — Nicholas A Jensen
*Assistant Examiner* — Ayodele Lawrence Olubodun
(74) *Attorney, Agent, or Firm* — Sage Patent Group

(57)          ABSTRACT

Embodiments herein relate a method performed by radio network node for handling communication of a UE in a wireless communication network. The radio network node is configured to determine to initiate or avoid initiation of a process for handing over communication of the UE from the radio network node of a first RAN to a second RAN based on whether the communication includes an emergency service or not, and an identity associated to the second RAN and/or the first RAN based on the target PLMN ID.

20 Claims, 14 Drawing Sheets

(51) Int. Cl.
H04W 48/04 (2009.01)
H04W 84/04 (2009.01)

(56) References Cited

U.S. PATENT DOCUMENTS

| | | | | |
|---|---|---|---|---|
| 2016/0142945 | A1* | 5/2016 | Keller | H04L 65/1095 |
| | | | | 370/331 |
| 2017/0366955 | A1* | 12/2017 | Edge | H04W 4/90 |
| 2018/0376384 | A1 | 12/2018 | Youn et al. | |
| 2019/0253917 | A1* | 8/2019 | Dao | H04M 15/8228 |
| 2020/0229069 | A1 | 7/2020 | Chun | |
| 2020/0396792 | A1* | 12/2020 | Tiwari | H04W 36/0085 |
| 2021/0144593 | A1* | 5/2021 | Ahn | H04W 36/0016 |
| 2021/0281993 | A1* | 9/2021 | Tiwari | H04W 60/04 |
| 2022/0030495 | A1* | 1/2022 | Qiao | H04W 24/04 |
| 2023/0043232 | A1* | 2/2023 | Ryu | H04W 76/27 |

OTHER PUBLICATIONS

3GPP TSG-RAN WG2 #107, R2-1909356, Prague, Czech Republic, Aug. 26-30, 2019, "Introducing Whitelists for Cell Reselection," Ericsson, XP051767157, 10 pages.
3rd Generation Partnership Project; Technical Specification Group Services and System Aspects; Service requirements for the 5G system; Stage 1 (Release 17) 3GPP TS 22.261 V17.0.0 (Sep. 2019) 83 pages.
3rd Generation Partnership Project; Technical Specification Group Services and System Aspects; Procedures for the 5G System (5GS); Stage 2 (Release 16) 3GPP TS 23.502 V16.2.0 (Sep. 2019) 525 pages.
3rd Generation Partnership Project; Technical Specification Group Services and System Aspects; System Architecture for the 5G System (5GS); Stage 2 (Release 16) 3GPP TS 23.501 V16.2.0 (Sep. 2019) 391 pages.

* cited by examiner

500. Receive Configuration

501. Receive MRL

502. Transmit request

503. Determine to initiate or avoid initiation of process for handing over communication of UE Determine to reject HO in case the communication is including emergency call and second RAN is associated to a different PLMN/operator than first RAN 504. Receive indication of reason Start End 12. Radio network node Communication interface 601. Processing circuitry 604. Memory 12. Radio network node 601. Processing circuitry 602. Determining unit 603. Receiving unit 604. Memory

606

605

NETWORK NODES, AND METHODS PERFORMED IN A WIRELESS COMMUNICATION NETWORK

CROSS REFERENCE TO RELATED APPLICATIONS

This application is a 35 U.S.C. § 371 national stage application of PCT International Application No. PCT/EP2020/071969 filed on Aug. 5, 2020, the disclosure and content of which is incorporated by reference herein in its entirety.

TECHNICAL FIELD

Embodiments herein relate to a radio network node, a network node, and methods performed therein regarding communication in a wireless communication network. Furthermore, a computer program product and a computer-readable storage medium are also provided herein. Especially, embodiments herein relate to handling or enabling communication, e.g. handling emergency calls, in the wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the UEs within range of the access node. The radio network node communicates over a downlink (DL) to the UE and the UE communicates over an uplink (UL) to the radio network node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with UEs. In a forum known as the Third Generation Partnership Project (3GPP), telecommunications suppliers propose and agree upon standards for present and future generation networks, and investigate, amongst others, enhanced data rate and radio capacity. In some RANs, e.g. as in UMTS, several radio network nodes may be connected, e.g., by landlines or microwave, to a controller node, such as a radio network controller (RNC) or a base station controller (BSC) in 2G, which supervises and coordinates various activities of the plural radio network nodes connected thereto. The RNCs are typically connected to one or more core networks. Specifications for the Evolved Packet System (EPS) have been completed within the 3GPP and this work continues in the coming 3GPP releases, such as 5G and 6G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G radio technologies also known as new radio NR, the use of e.g. very many transmit- and receive-antenna elements as in 4G is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network i.e. 5G core (5GC).

Overview of the NG-RAN Architecture.

Similar to E-UTRAN in 4G, the NG-RAN uses a flat architecture and consists of base stations, e.g. gNBs and/or ng-eNBs, which may be interconnected with each other by means of the Xn-interface. The gNBs are also connected by means of the N2 and N3 interface to the 5GC, more specifically to the Access and Mobility Function (AMF) by the N2 interface and to the User Plane Function (UPF) by means of the N3 interface. The gNB in turn supports one or more cells which provides the radio access to the UE. The radio access technology, called New Radio (NR) is orthogonal frequency-division multiplexing (OFDM) based like in LTE and offers high data transfer speeds and low latency. Note that NR is sometimes used to refer to the whole 5G system although it is strictly speaking only the 5G radio access technology.

It is expected that NR will be rolled out gradually on top of the legacy LTE network starting in areas where high data traffic is expected. This means that NR coverage will be limited in the beginning and users must move between NR and LTE as they go in and out of coverage. To support fast mobility between NR and LTE and avoid change of core network, LTE eNBs may also connect to the 5G-CN and support the Xn interface. An eNB connected to 5GC is called a next generation eNB (ng-eNB) and is considered part of the NG-RAN.

Voice over LTE (VoLTE) is deployed in many operator networks and Emergency calls over LTE is as well being deployed and the number of deployments is increasing with the introduction of 5GS and also the sunset of 2G/3G.

5G System architecture is defined in 3GPP TS 23.501 v.16.3.0 as well as Emergency service is also defined in § 5.16.4. The emergency service is based on IMS (TS 23.228 v.16.3.0) based emergency calls.

The roaming models for 5G system defined are either Home routed or LBO. Here the Home routed model is shown in FIG. 1*a.*

Inter system handover, i.e. handover (HO) within systems, in 5GS is further defined in 3GPP TS 23.502 v.16.3.0 in § 4.9.1.3 for inter NG-RAN handover and § 4.11.1.1 for inter system handover from 5GS to EPS.

There are several regions like Europe and North America where national roaming is used. It implies that two national public land mobile networks (PLMN) have an agreement where one or both are dependent on the coverage of the other. In national roaming, see FIG. 1*b*, both the national roaming partner i.e. the national Visited Public Mobile Network (VPMN), and the home operator may have no full coverage and its subscribers may use the national roaming partner network. It is possible to decide to use handover between RANs owned by different mobile network operators (MNO). Session Management Function (SMF)/UPF for IP Multimedia Subsystem (IMS) protocol data unit (PDU)/ packet data network (PDN) is in the network that owns the subscriber. Such scenarios normally are based on above home routed roaming architecture. This may also apply to international roaming where borders are possible to cross with an ongoing call. Additionally, it applies to 5GS but also to EPS (4G) and 5G-EPS.

It should be noted though that Emergency calls are always a serving NW function, so each network would provide emergency services to their own but also to national, as well as to international, inbound roamers.

In such deployments, the two national roaming partners rely on each other's coverage and as an example the 1st PLMN subscriber will be served by the second NW in some areas.

The two national roaming partners may enable also connected mode mobility, i.e. to enable that a voice call can survive seamlessly when a subscriber in session changes from one to another radio coverage.

Currently, 3GPP TS 23.501 v.16.3.0 states that for Emergency Services, there is no support for inter PLMN mobility thus there is a risk of service disruption due to failed inter PLMN mobility attempts.

SUMMARY

While the above is the current state of 3GPP there are however no defined procedures for how the NW can avoid to handover an emergency call from one network (NW) to another if RAN is configured for HO for normal calls. The problem is basically that the two national roaming partners might have connections to different public safety answering points (PSAP)/emergency call centers, and due to this will a handover from one network using PSAP 1 to another network using PSAP 2 fails to succeed. There is therefore a risk of losing emergency calls which should have been kept in the serving NW, e.g. by handover to another radio access technology (RAT), 5GS to EPS in same NW rather than an attempt to handover to a partner PLMN and thereby dropping the call, which is not acceptable. There are also procedures by which the PSAP asks for current location information from the GMLC, and such queries would be from the PSAP to the network in which the call has started (and which may only provide location information for own PLMN).

An object of embodiments herein is to provide a mechanism that improves communication in the wireless communication network.

According to an aspect the object is achieved by providing a method performed by a radio network node for handling communication of a UE in a wireless communication network. The radio network node determines to initiate or avoid initiation of a process for handing over communication of the UE from the radio network node of a first RAN, to a second RAN based on whether the communication includes an emergency service or not, and on an identity associated to the second RAN and/or the first RAN, e.g. based on the target PLMN ID.

According to an aspect the object is achieved by providing a method performed by a network node, such as an AMF or MME, for handling communication of a UE in a wireless communication network. The network node receives a request from a radio network node of a first RAN, for handing over communication of the UE to a second RAN. The network node may then determine to accept or reject the handover of the UE based on whether the communication includes an emergency service or not, and on an identity associated to the second RAN and/or the first RAN, e.g. based on the target PLMN ID. Alternatively or additionally, the network node such as an operation and maintenance (O&M) node, may send an indication to the radio network node, wherein the indication indicates that HO to a certain PLMN is restricted during emergency communication.

It is furthermore provided herein a computer program product comprising instructions, which, when executed on at least one processor, cause the at least one processor to carry out any of the methods above, as performed by the network node or the radio network node, respectively. It is additionally provided herein a computer-readable storage medium, having stored thereon a computer program product comprising instructions which, when executed on at least one processor, cause the at least one processor to carry out the method according to any of the methods above, as performed by the network node or the radio network node, respectively.

According to still another aspect the object is achieved by providing a network node for handling communication of a UE in a wireless communication network. The network node is configured to receive a request from a radio network node of a first RAN, for handing over communication of the UE to a second RAN. The network node is configured to determine to accept or reject the handover of the UE based on whether the communication includes an emergency service or not, and on an identity associated to the second RAN and/or the first RAN, e.g. based on the target PLMN ID. Alternatively or additionally, the network node is configured to send an indication to the radio network node, wherein the indication indicates that HO to a certain PLMN is restricted during emergency communication.

According to yet another aspect the object is achieved by providing a radio network node for handling communication of a UE in a wireless communication network. The radio network node is configured to determine to initiate or avoid initiation of a process for handing over communication of the UE from the radio network node of a first RAN, to a second RAN based on whether the communication includes an emergency service or not, and on an identity associated to the second RAN and/or the first RAN, e.g. based on the target PLMN ID.

Embodiments herein reduce the risk for dropping emergency calls by avoiding handover to e.g. a roaming partner RAN. The solutions are based on either local configuration in RAN or extending an Mobility Restriction List provided to the radio network node alternatively by rejecting a handover required from RAN to Core where the network node in CN takes the decision. Since embodiments herein avoid dropping emergency calls the communication in the wireless communication network is improved.

BRIEF DESCRIPTION OF THE DRAWINGS

Embodiments will now be described in more detail in relation to the enclosed drawings, in which.

DETAILED DESCRIPTION

Embodiments herein are described in the context of 5G/NR and LTE but the same concept can also be applied to other wireless communication system such as 4G/LTE and UMTS. Embodiments herein may be described within the context of 3GPP NR radio technology, e.g. using gNB as the radio network node. It is understood that the problems and solutions described herein are equally applicable to wireless access networks and user equipments (UEs) implementing other access technologies and standards. NR is used as an example technology where embodiments are suitable and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1A:
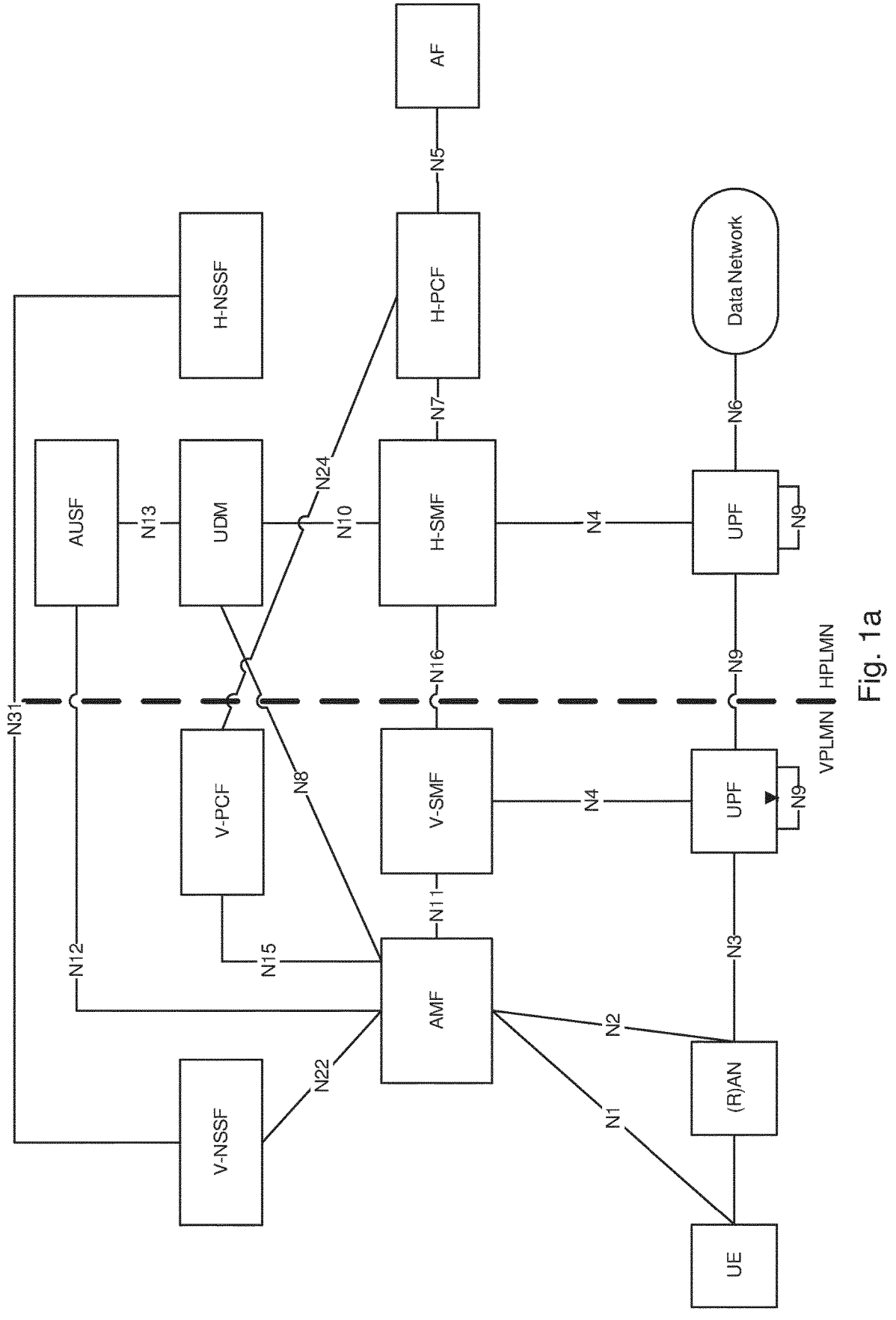
FIG. 1a shows a system architecture used for communicating according to prior art.
Figure 1B:
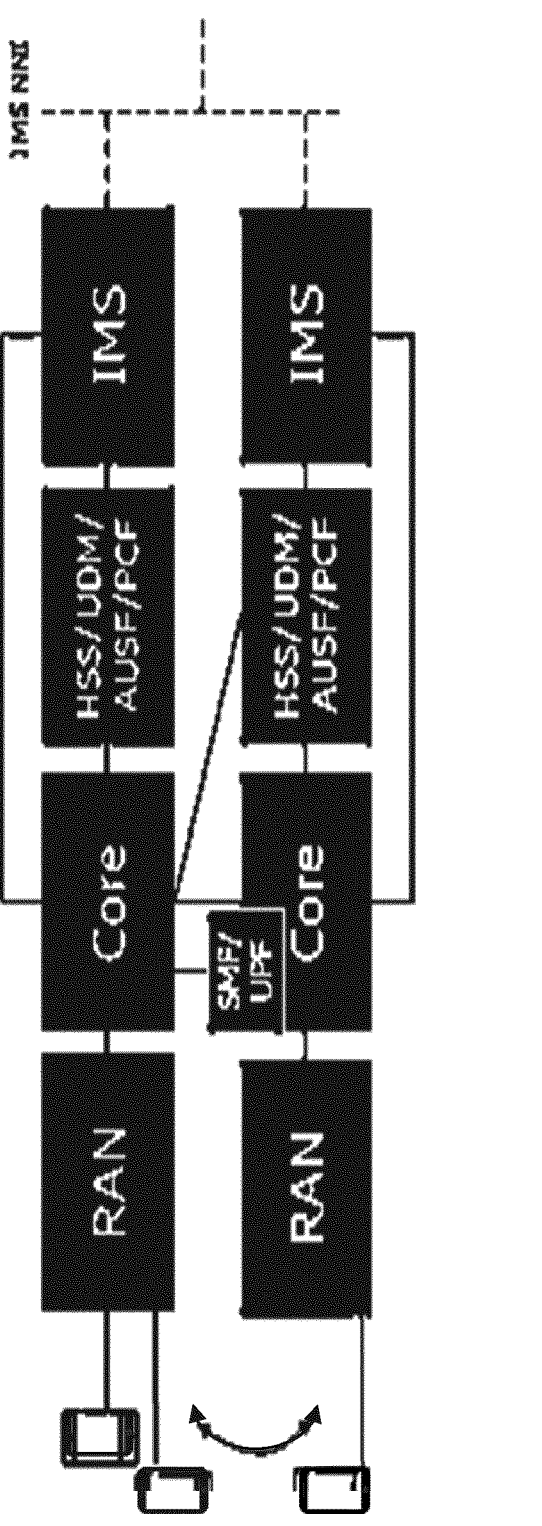
FIG. 1b shows a national roaming scenario according to prior art.
Figure 2:
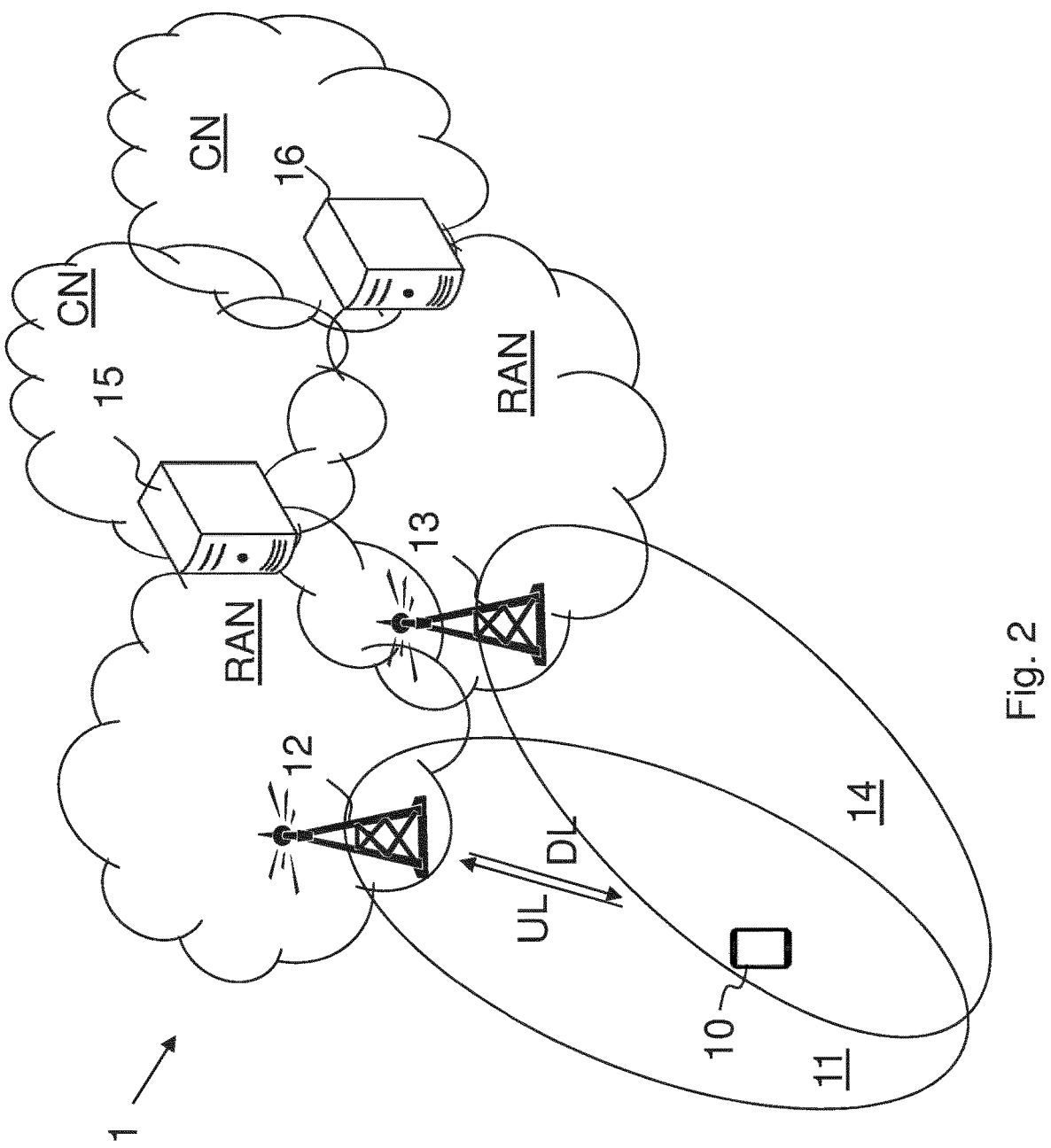
FIG. 2 shows a wireless communication network according to embodiments herein.

Embodiments herein relate to wireless communication networks in general. FIG. 2 is a schematic overview depicting a wireless communication network 1. The wireless communication network 1 comprises e.g. one or more RANs and one or more CNs. The wireless communication network 1 may use one or a number of different technologies, such as Wi-Fi, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G systems in combination with LTE, however, embodiments are also applicable in further development of the existing communication systems such as e.g. a WCDMA/LTE system.

In the wireless communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The communication network 1 comprises a first radio network node 12 of a first RAN providing e.g. radio coverage over a geographical area, a first service area 11 i.e. a first cell, of a first radio access technology (RAT), such as NR, LTE, Wi-Fi, WiMAX or similar. The first radio network node 12 may herein be referred to as the radio network node and may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The first radio network node 12 may alternatively or additionally be a controller node or a packet processing node or similar. The first radio network node 12 may be referred to as source access node or a serving network node wherein the first service area 11 may be referred to as a serving cell, source cell or primary cell, and the first radio network node communicates with the UE 10 in form of DL transmissions to the UE 10 and UL transmissions from the UE 10. The first radio network node may be a distributed node comprising a baseband unit and one or more remote radio units.

The communication network 1 comprises a second radio network node 13 on a second RAN providing e.g. radio coverage over a geographical area, a second service area 14 i.e. a second cell, of a second radio access technology (RAT), such as NR, LTE, Wi-Fi, WiMAX or similar. The second radio network node 13 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The second radio network node 13 may alternatively or additionally be a controller node or a packet processing node or similar. The second radio network node 13 may be referred to as a target access node or a target network node wherein the second service area 14 may be referred to as a target cell or secondary cell, and the second radio network node 13 communicates with the UE 10 in form of DL transmissions to the UE 10 and UL transmissions from the UE 10. The second radio network node may be a distributed node comprising a baseband unit and one or more remote radio units. The second RAT may be the same or different than the first RAT.

It should be noted that a service area may be denoted as cell, beam, beam group or similar to define an area of radio coverage. It should further be noted that the first and second cell may be provided by the same radio network node.

The communication network may further comprise a first network node 15, e.g. a AMF, MME, an operation and maintenance (O&M) node, or a network node handling mobility of UEs in the source cell in the wireless communication network. The communication network may further comprise a second network node 16, e.g. a AMF, MME, an O&M node or a network node handling mobility of UEs in the target cell in the wireless communication network.

Embodiments herein relate to methods and apparatuses for determining whether to initiate or avoid initiation of a process for handing over communication of the UE 10 from the first RAN to the second RAN based on whether the communication includes an emergency service or not, and on an identity associated to the second RAN and/or the first RAN, e.g. based on the target PLMN ID.

Solutions herein enable RAN to support HO of normal calls while treating emergency calls separately and avoid handover of emergency call to another PLMN with risk for dropping the emergency call and rather maintain the emergency call longer on current RAT or possibly trigger mobility to another RATs in current NW (if possible) to reduce the risk for dropping the emergency call.

The first radio network node 12 generally considers a Mobility Restriction List (MRL) provided from a Packet Core such as the 5GC to the first radio network node 12, to restrict in mobility cases e.g. handovers. For EPC the terminology is Handover Restriction List (HRL), but the functionality is very similar. Mobility Restriction List is defined in 23.501 v.16.3.0, where the subscription data for the restrictions is stored in a unified data management (UDM) node.

MRL is provided from the network node 15 such as the AMF to NG-RAN during 5GC registration—e.g. in NG-AP-3GPP TS 38.413-in "Initial Context Setup" or "Downlink NAS Transport".

The Mobility Restriction List currently does not differentiate between Emergency calls and normal calls, and emergency calls may be dropped during roaming.

The solution to the problem may be one of the following:
1. A HO request from the first radio network node 12 to source network node 15 e.g. AMF/MME, if target RAN is of another PLMN, is rejected by the network node 15 if the target PLMN is e.g. on a blacklist of PLMNs or alternatively not on a whitelist of PLMNs.
   Additional to the solution: The target network node 16 e.g. MME/AMF may have a local configuration to prevent any mobility attempt from another PLMN if an emergency call is ongoing for the UE. Target network node 16 may send an indication back to source network node 15 to inform about the reason for the reject and to prevent further handover attempts. The network node 15 may build up a blacklist of PLMNs for which handover of emergency calls is restricted.
2. The MRL that is provided to the radio network node may be extended to differentiate normal Vs. emergency where additional information of emergency may indicate that inter PLMN HO is restricted for emergency. The first radio network node 12 may not initiate handover for emergency if target RAN/RAT/PLMN is restricted for emergency.
3. The first radio network node 12 may have a local configuration to avoid HO if neighboring cell is in another PLMN and emergency call is ongoing. The configuration may be performed on all radio network nodes via an O&M interface on which PLMN is restricted. The first radio network node 12 may not initiate handover for emergency to neighboring cell in another PLMN if on that list and emergency call is ongoing.

Figure 3A:
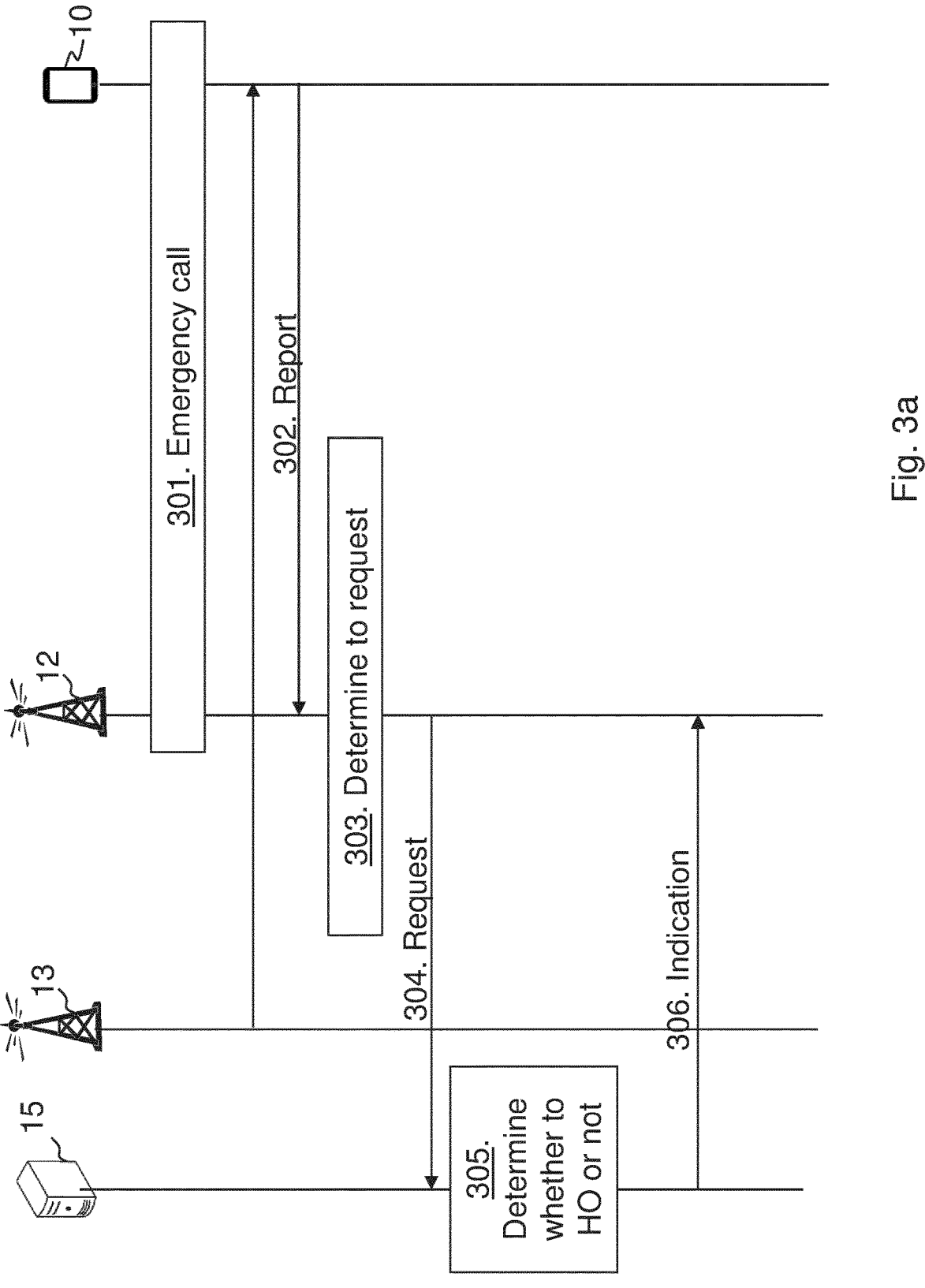
FIG. 3a shows a combined signalling scheme and flowchart according to some embodiments herein.

FIG. 3a is a combined signalling scheme and flowchart according to embodiments herein. In this example the UE is connected to the first RAN.

Action 301. The UE is performing an emergency service in the first RAN. An ongoing emergency call may have been established on LTE/EPC (GSMA PRD IR.92 VoLTE) or on NR/5GC (GSMA PRG NG.114).

Action 302. The UE may move towards the second radio network node 13 receiving signals of the second RAN and transmit a measurement report to the first radio network node 12 indicating signal strengths of the second RAN.

Action 303. The first radio network node 12 may then determine whether to initiate a handover (HO) the UE based on the measurement report. That is, the first radio network node 12 may determine to transmit a request to handover the UE 10 to the second RAN based on the report.

Action 304. The first radio network node 12 may then in case determined to transmit the request, transmit the request to the network node 15 of the first RAN.

Action 305. The network node 15 may then determine to accept or reject the handover of the UE based on whether the communication includes an emergency service or not, and on the identity of the second RAN e.g. second PLMN ID.

Action 306. The network node 15 may then send an indication back to the first radio network node indicating the decision and/or reason.

According to embodiments herein an emergency call may be restricted for handover to another PLMN. Following is showing two scenarios from 3GPP TS 23.502 where first one is inter NG-RAN HO (§ 4.9.1.3.2) and second is 5GS to EPS handover (§ 4.11.1.2.1). Firstly, RAN triggers a Handover Required. The network node e.g. source AMF either needs to continue the communication toward a target network node such as a target AMF or toward an MME (in this case would be an AMF/MME in another PLMN). In this solution it is proposed that AMF when recognizing that there is an Emergency call is ongoing, e.g. considering existence of an Emergency PDU session, would reject the Handover attempt from RAN with a cause code. If a new cause code is defined, then RAN can mark the PLMN as not allowed.

Below is also a Handover Required command is shown and the information about the PLMN id further down.

```
HandoverRequiredIEs NGAP-PROTOCOL-IES ::= {
  { ID id-AMF-UE-NGAP-ID                        CRITICALITY reject TYPE AMF-UE-NGAP-ID
  { ID id-RAN-UE-NGAP-ID                        CRITICALITY reject TYPE RAN-UE-NGAP-ID
  { ID id-HandoverType                          CRITICALITY reject TYPE HandoverType
  { ID id-Cause                                 CRITICALITY ignore TYPE Cause
  { ID id-TargetID                              CRITICALITY reject TYPE TargetID
  { ID id-DirectForwardingPathAvailability      CRITICALITY ignore TYPE DirectForwardingPathAvailability
  { ID id-PDUSessionResourceListHORqd           CRITICALITY reject TYPE PDUSessionResourceListHORqd
  { ID id-SourceToTarget-TransparentContainer   CRITICALITY reject TYPE SourceToTarget-TransparentContainer
  ...
}
```

1.1.1.1 Target ID

This IE identifies the target for the handover.

| IE/Group Name | Presence | Range | IE type and reference | Semantics description |
|---|---|---|---|---|
| CHOICE Target ID | M | | | |
| >NG-RAN | | | | |
| >>Global RAN Node ID | M | | 9.3.1.5 | |
| >>Selected TAI | M | | TAI 9.3.3.11 | |
| >E-UTRAN | | | | |
| >>Global eNB ID | M | | Global ng-eNB ID 9.3.1.8 | |
| >>Selected EPS TAI | M | | EPS TAI 9.3.3.17 | |
| >Target RNC-ID | | | | |
| >>LAI | M | | 9.3.3.30 | |
| >>RNC-ID | M | | 9.3.1.123 | If the Extended RNC-ID IE is included in the Target ID IE, the RNC-ID IE shall be ignored. |
| >>Extended RNC-ID | O | | 9.3.1.124 | The Extended RNC-ID IE shall be used if the RNC identity has a value larger than 4095. |

1.1.1.2 9.3.1.5 Global RAN Node ID

This IE is used to globally identify an NG-RAN node (see TS 38.300 [8]).

| IE/Group Name | Presence | Range | IE type and reference | Semantics description |
|---|---|---|---|---|
| CHOICE NG-RAN node | M | | | |
| >gNB | | | | |
| >>Global gNB ID | M | | 9.3.1.6 | |
| >ng-eNB | | | | |
| >>Global ng-eNB ID | M | | 9.3.1.8 | |
| >N3IWF | | | | |
| >>Global N3IWF ID | M | | 9.3.1.57 | |

1.1.1.3 9.3.1.6 Global gNB ID

This IE is used to globally identify a gNB (see TS 38.300 [8]).

| IE/Group Name | Presence | Range | IE type and reference | Semantics description |
|---|---|---|---|---|
| PLMN Identity | M | | 9.3.3.5 | |
| CHOICE gNB ID | M | | | |
| >gNB ID | | | | |
| >>gNB ID | M | | BIT STRING (SIZE (22 . . . 32)) | Equal to the leftmost bits of the NR Cell Identity IE contained in the NR CGI IE of each cell served by the gNB. |

Figure 3B:
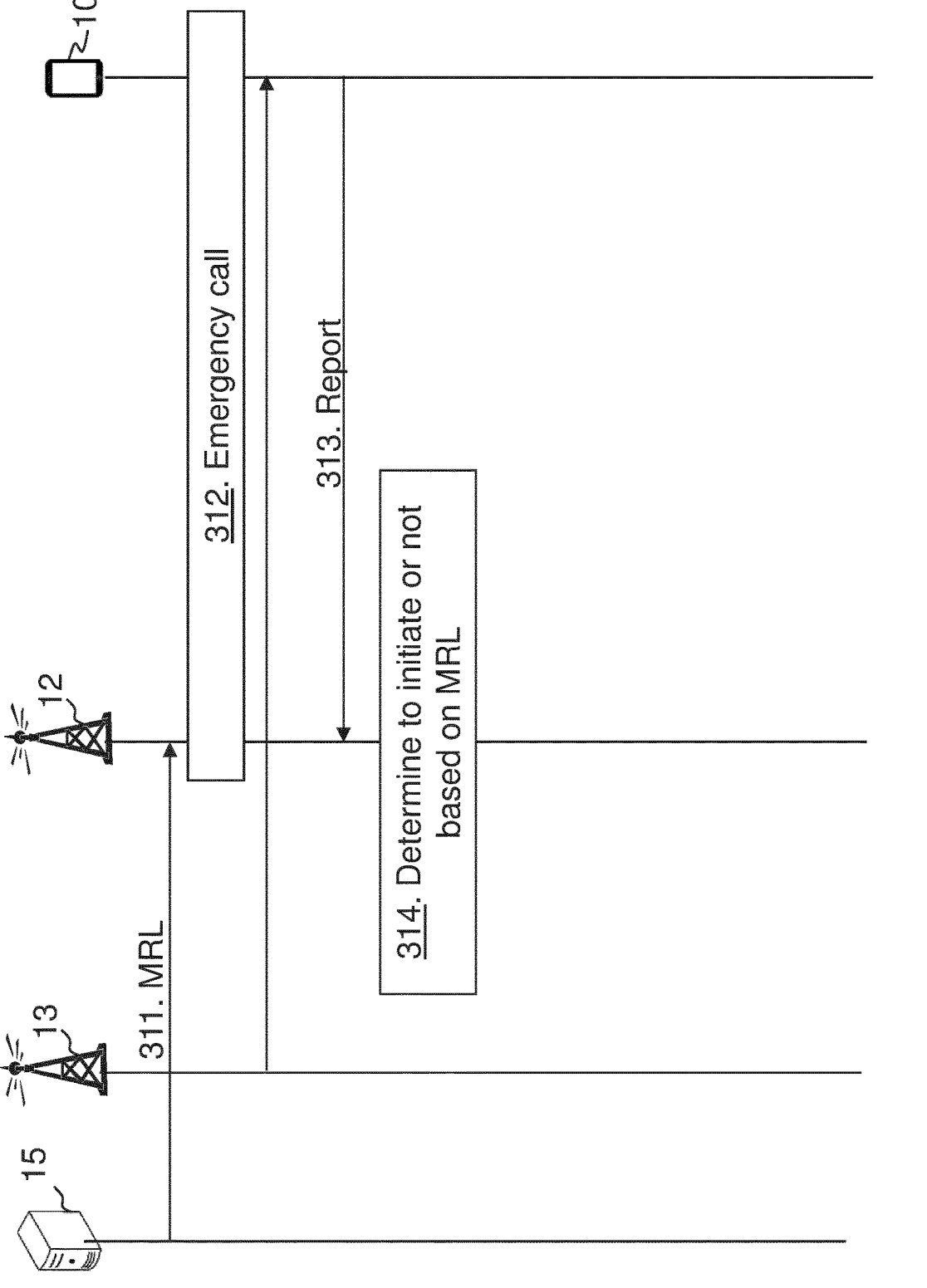
FIG. 3b shows a combined signalling scheme and flowchart according to some embodiments herein.

FIG. 3*b* is a combined signalling scheme and flowchart according to embodiments herein. In this example the UE is connected to the first RAN.

Action 311. The network node 15 may send an MRL to the first radio network node 12, wherein the MRL differentiates normal communication versus emergency communication where an emergency entry in the MRL for emergency communications indicates that HO to a certain PLMN is restricted during emergency communication.

Action 312. The UE 10 is performing an emergency service in the first RAN i.e. first PLMN. An ongoing emergency call may have been established on LTE/EPC (GSMA PRD IR.92 VoLTE) or on NR/5GC (GSMA PRG NG.114).

Action 313. The UE 10 may move towards the second radio network node 13 receiving signals of the second RAN i.e. second PLMN, and may transmit a report to the first radio network node 12 indicating signal strengths of the second RAN.

Action 314. The first radio network node 12 may then determine whether to initiate or avoid initiation of a process for handing over communication of the UE 10 from the first radio network node 12 of the first RAN, to the second radio network node 13 of the second RAN based on the MRL e.g. indicating the second PLMN to be avoided.

A unique Emergency MRL or extended to include emergency calls aspects can be considered.

The solution is to extend the MRL (original example below) to indicate to RAN that Emergency calls shall be treated differently. The MRL is stored in UDM/home subscriber server (HSS) and in such case the procedures to retrieve the information and provide it to RAN will be un-changed while RAN procedures need to be modified to be based on detection of emergency calls, enforce the emergency call specific MRL. Another alternative is that AMF is locally configured with relevant MRL details regarding which PLMNs to not allow handover of emergency calls to/from.

Following is the current structure of the MRL in 3GPP TS 38.413

```
MobilityRestrictionList ::= SEQUENCE {
    serving-PLMN                  PLMN-Identity,
    equivalent-PLMNs              SEQUENCE (SIZE (1..maxnoofEPLMNs)) OF PLMN-
Identity            OPTIONAL,
    rat-Restrictions              RAT-
RestrictionsList                           OPTIONAL,
    forbiddenAreaInformation      ForbiddenAreaList
        OPTIONAL,
serviceAreaInformation            ServiceAreaList
        OPTIONAL,
    iE-Extensions       ProtocolExtensionContainer { {MobilityRestrictionList-
ExtIEs} }           OPTIONAL,
    ...
}
MobilityRestrictionList-ExtIEs XNAP-PROTOCOL-EXTENSION :: = {
{ ID id-LastE-UTRANPLMNIdentity        CRITICALITY ignore  EXTENSION
PLMN-Identity                   PRESENCE optional       }|
{ ID id-CNTypeRestrictionsForServing      CRITICALITY ignore  EXTENSION
CNTypeRestrictionsForServing        PRESENCE optional       }|
{ ID id-CNTypeRestrictionsForEquivalent     CRITICALITY ignore   EXTENSION
CNTypeRestrictionsForEquivalent        PRESENCE optional        },
```

Figure 3C:
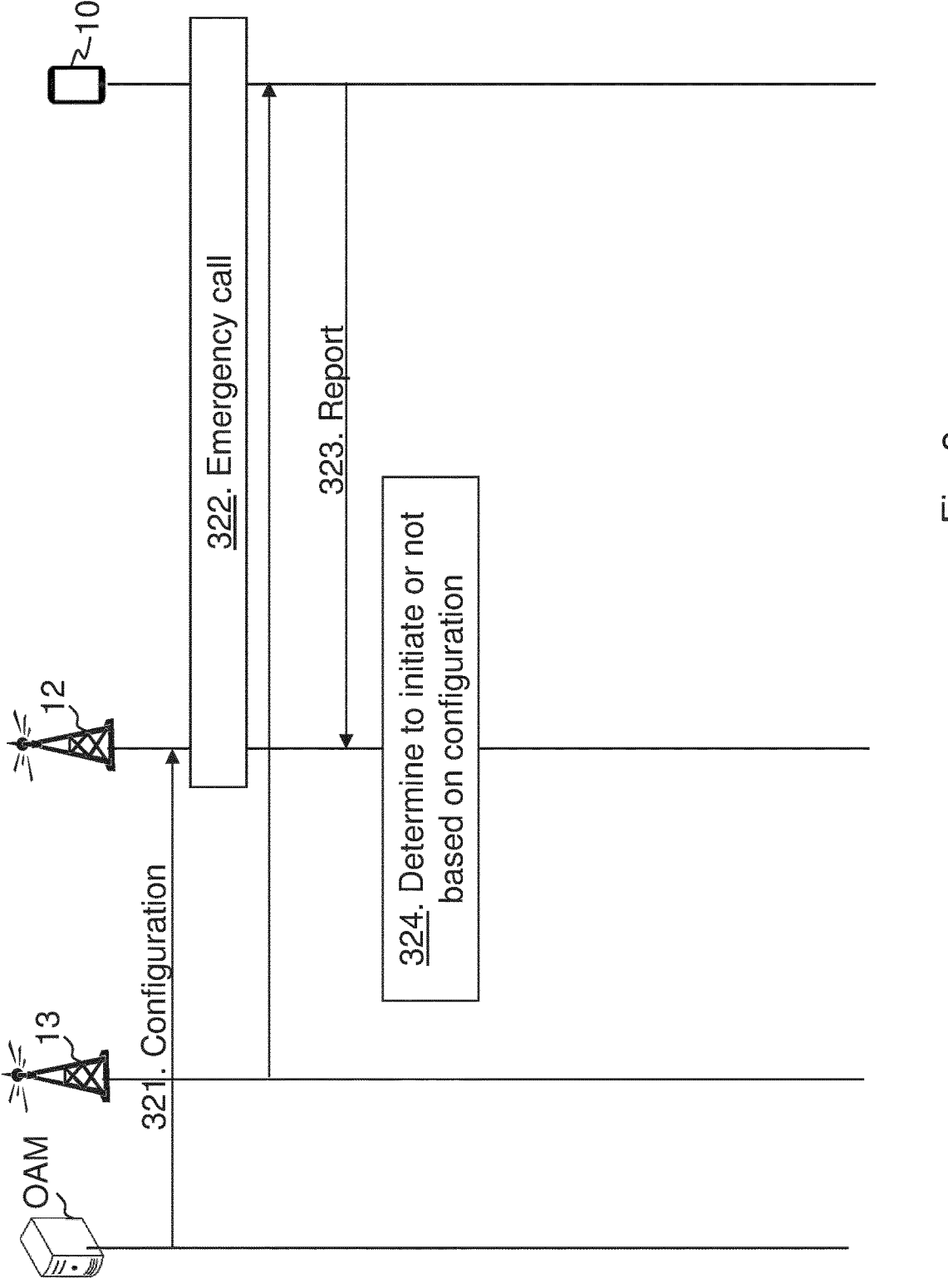
FIG. 3c shows a combined signalling scheme and flowchart according to some embodiments herein.

FIG. 3c is a combined signalling scheme and flowchart according to embodiments herein. In this example the UE is connected to the first RAN.

Action 321. An O&M node may send configuration to the first radio network node 12, wherein the configuration indicates that HO to a certain PLMN is restricted during emergency communication.

Action 322. The UE 10 is performing an emergency service in the first RAN. An ongoing emergency call may have been established on LTE/EPC (GSMA PRD IR.92 VoLTE) or on NR/5GC (GSMA PRG NG.114).

Action 323. The UE 10 may move towards the second radio network node 13 receiving signals of the second RAN and transmit a report to the first radio network node 12 indicating signal strengths of the second RAN.

Action 324. The first radio network node 12 may then determine whether to initiate or avoid initiation of a process for handing over communication of the UE 10 from the first radio network node 12 of the first RAN, to the second radio network node 13 of the second RAN based on the configuration.

RAN nodes are configured via O&M interface with PLMN id of neighboring nodes and policy that an emergency call shall not be subject for HO to a cell if cell belongs to another PLMN than allowed PLMNs.

For example, RAN may recognize an emergency call based on the ARP of the bearer. At a HO decision, RAN would need to consider the local emergency configuration to decide whether the measurement reports indicate a target cell that belongs to another PLMN to avoid such handover. The RAN would then need to consider a different target cell, including other RATs in same PLMN (even though the signal strength is not as good as the neighboring PLMN cell and despite that the MRL indicates that mobility is allowed i.e. allowed only for normal calls).

Figure 4:
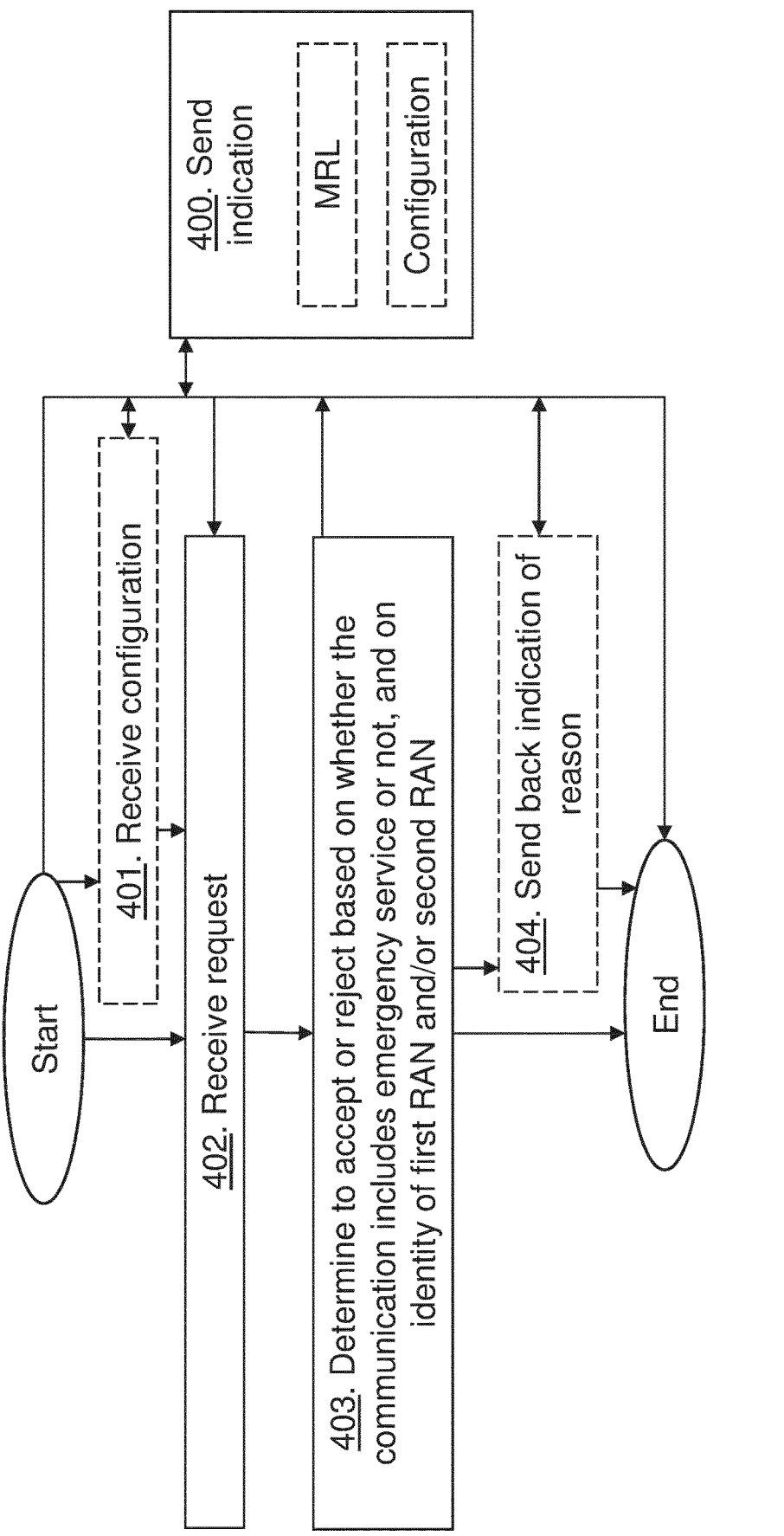
FIG. 4 shows a flowchart depicting a method perform by a network node according to embodiments herein.

The method actions performed by the network node 15 such as the AMF or an O&M node for handling communication of the UE 10 in the wireless communication network according to embodiments will now be described with reference to a flowchart depicted in FIG. 4. The actions do not have to be taken in the order stated below, but may be taken in any suitable order. The network node is associated with the first RAN.

Action 400. The network node may send an indication to the first radio network node 12, wherein the indication indicates that HO to a certain PLMN is restricted during emergency communication. The indication may comprise the MRL, wherein the MRL differentiates normal communication versus emergency communication where an emergency entry in the MRL for emergency communications indicates that HO to a certain PLMN is restricted during emergency communication. The indication may comprise a configuration, wherein the configuration indicates that HO to a certain PLMN is restricted during emergency communication.

Action 401. The network node may receive a configuration, from e.g. an O&M node, indicating a blacklist of PLMNs for which handover of emergency calls is restricted or a whitelist of PLMNs for which handover of emergency calls is allowed.

Action 402. The network node 15 receives the request from the radio network node of the first RAN, for handing over communication of the UE to a second RAN.

Action 403. The network node 15 may then determine to accept or reject the handover of the UE based on whether the communication includes an emergency service or not, and on an identity associated to the second RAN and/or the first RAN e.g. identity may be radio network node identity and/or PLMN ID. The network node 15 may then determine to reject the handover in case the communication is including an emergency call and the second RAN is associated to a different PLMN than the first RAN and/or is associated to a different PLMN of a different operator than the first RAN. The different PLMN may be on a blacklist of PLMNs, or not on a whitelist of PLMNs.

Action 404. The network node may, in case rejecting the handover, send back an indication to the radio network node indicating a reason for the rejection to prevent further handover attempts.

Figure 5:
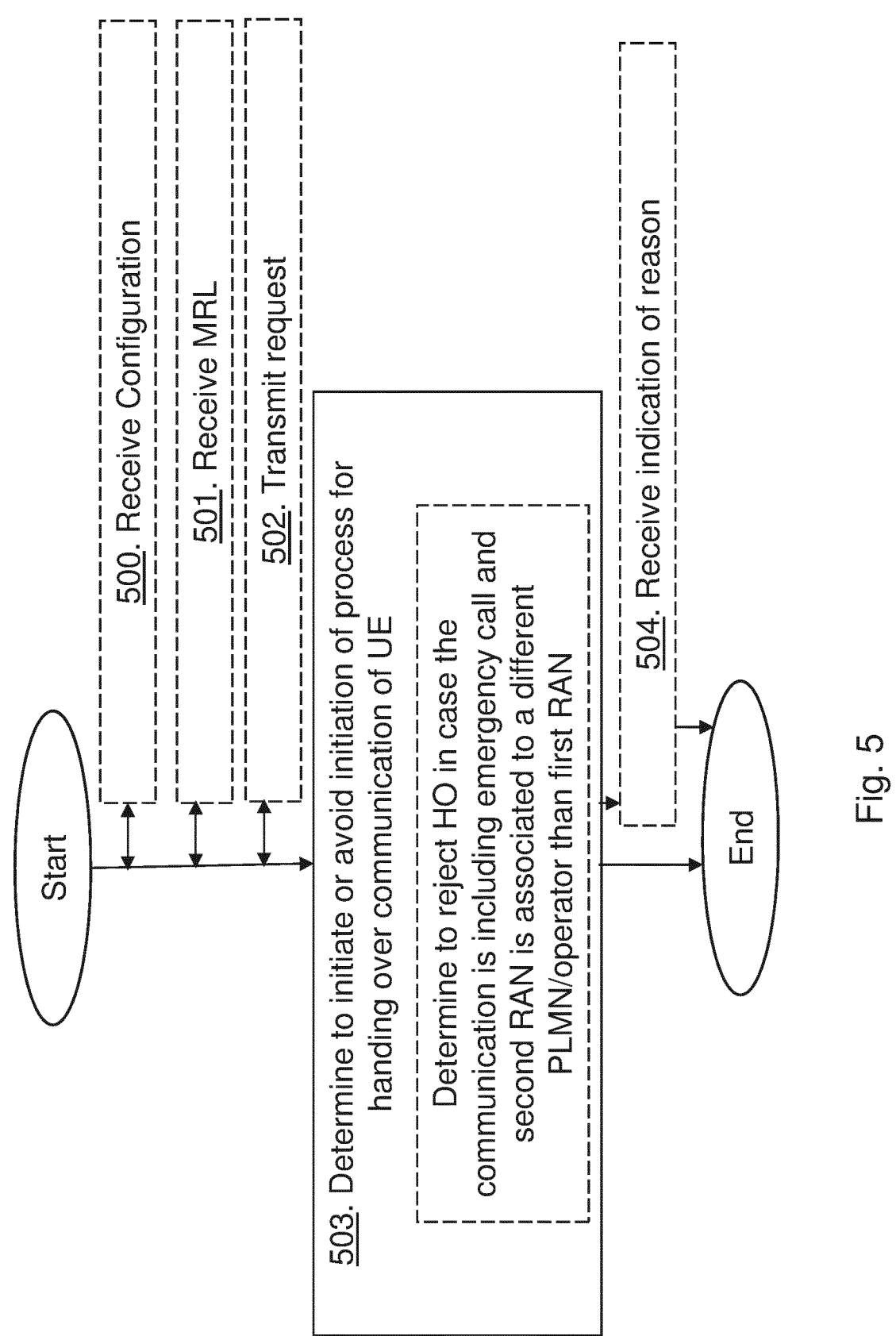
FIG. 5 shows a flowchart depicting a method perform by a radio network node according to embodiments herein.

The method actions performed by the radio network node such as the gNB for handling communication of the UE in the wireless communication network according to embodiments will now be described with reference to a flowchart depicted in FIG. 5. The actions do not have to be taken in the order stated below, but may be taken in any suitable order.

Action 500. The radio network node 12 may receive configuration to avoid initiation of HO of emergency communication when second RAN is in another PLMN and emergency call is ongoing.

Action 501. The radio network node 12 may receive the MRL, wherein the MRL differentiates normal communications versus emergency communications where an emergency entry in the MRL for emergency communications indicates that HO to a certain PLMN is restricted during emergency communication Action 502. The radio network node 12 may transmit a request to a network node for handing over communication of the UE to the second RAN.

Action 503. The radio network node 12 determines to initiate or avoid initiation of a process for handing over communication of the UE from the radio network node 12 of the first RAN to a second RAN, e.g. the second radio network node 13, based on whether the communication includes an emergency service or not, and on the identity associated to the second RAN and/or the first RAN, e.g. based on the target PLMN ID. The radio network node 12 may determine to avoid initiation of the process in case the communication is including an emergency call and the second RAN is associated to a different PLMN than the first RAN and/or is associated to a different PLMN of a different operator than the first RAN, otherwise the radio network node 12 may initiate the process. The different PLMN may be on a blacklist of PLMNs or not on a whitelist of PLMNs. The radio network node 12 may determine to initiate or avoid initiation of the process based on the MRL.

Action 504. The radio network node 12 may receive an indication from the network node 15 indicating a reason for the rejection to prevent further handover attempts.

Figure 6:
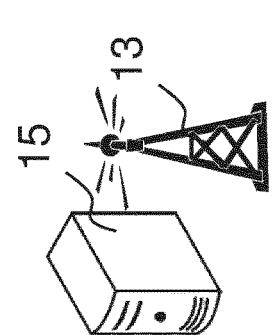
FIG. 6 shows a radio network node according to embodiments herein.
Figure 6:
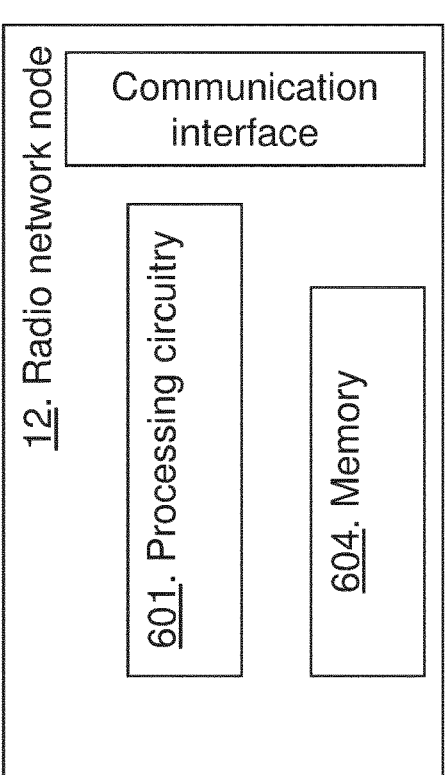
Figure 6:
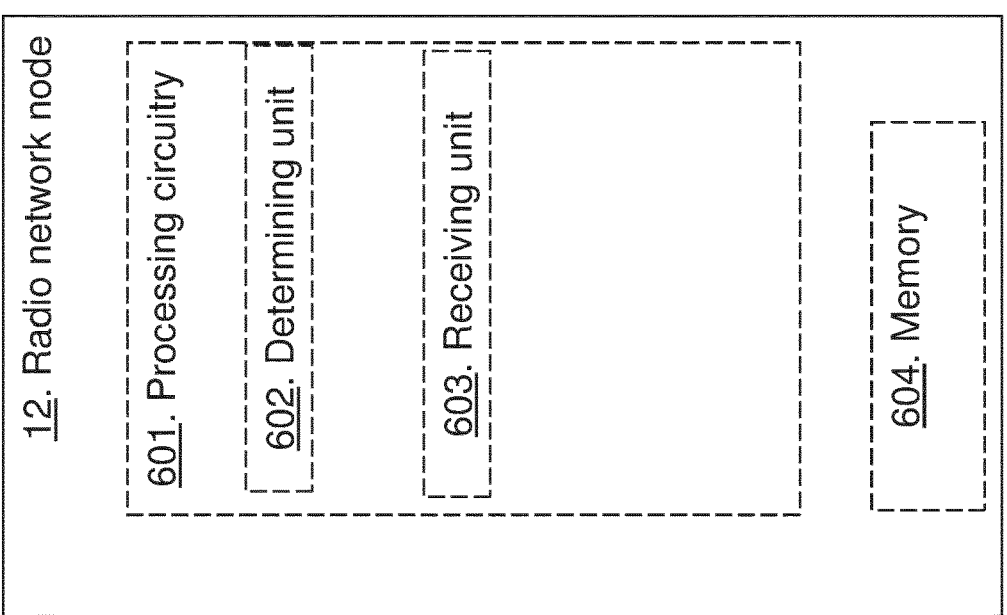
Figure 6:
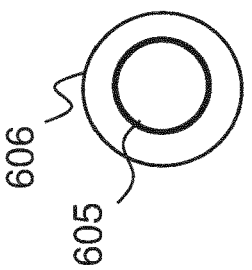

FIG. 6 is a block diagram depicting the radio network node such as the first radio network node 12, in two embodiments, for handling communication for the UE 10 in the wireless communication network 1 according to embodiments herein.

The radio network node may comprise processing circuitry 601, e.g. one or more processors, configured to perform the methods herein.

The radio network node may comprise a determining unit 602. The radio network node, the processing circuitry 601 and/or the determining unit 602 is configured to determine to initiate or avoid initiation of a process for handing over communication of the UE from the radio network node of the first RAN to the second RAN based on whether the communication includes the emergency service or not, and on the identity associated to the second RAN and/or the first RAN, e.g. based on being an emergency call to identity of the second PLMN. The radio network node, the processing circuitry 601 and/or the determining unit 602 may be configured to determine to avoid initiation of the process in case the communication is including an emergency call and the second RAN is associated to a different PLMN than the first RAN and/or is associated to a different PLMN of a different operator than the first RAN, otherwise to initiate the process. The different PLMN is on a blacklist of PLMNs or not on a whitelist of PLMNs.

The radio network node may comprise a receiving unit 603, e.g. a receiver or a transceiver. The radio network node, the processing circuitry 601 and/or the receiving unit 603 may be configured to receive the MRL, wherein the MRL differentiates normal communications versus emergency communications where an emergency entry in the MRL for emergency communications indicates that HO to a certain PLMN is restricted during emergency communication. The radio network node, the processing circuitry 601 and/or the determining unit 602 may then be configured to determine to initiate or avoid initiation of the process based on the MRL.

The radio network node, the processing circuitry 601 and/or the receiving unit 603 may be configured to receive the configuration to avoid initiation of HO of emergency communication when second RAN is in another PLMN, and emergency call is ongoing.

The radio network node, the processing circuitry 601 and/or the receiving unit 603 may be configured to receive an indication from the network node indicating a reason for the rejection to prevent further handover attempts.

The radio network node further comprises a memory 604. The memory comprises one or more units to be used to store data on, such as indications, strengths or qualities, grants, messages, execution conditions, user data, reconfiguration, configurations, scheduling information, timers, applications to perform the methods disclosed herein when being executed, and similar. Thus, the radio network node may comprise the processing circuitry and the memory, said memory comprising instructions executable by said processing circuitry whereby said radio network node is operative to perform the methods herein. The network node comprises a communication interface comprising transmitter, receiver, transceiver and/or one or more antennas.

The methods according to the embodiments described herein for the radio network node are respectively implemented by means of e.g. a computer program product 605 or a computer program product, comprising instructions, i.e., software code portions, which, when executed on at least one processor, cause the at least one processor to carry out the actions described herein, as performed by the radio network node. The computer program product 605 may be stored on a computer-readable storage medium 606, e.g. a universal serial bus (USB) stick, a disc or similar. The computer-readable storage medium 606, having stored thereon the computer program product, may comprise the instructions which, when executed on at least one processor, cause the at least one processor to carry out the actions described herein, as performed by the radio network node. In some embodiments, the computer-readable storage medium may be a non-transitory or transitory computer-readable storage medium.

Figure 7:
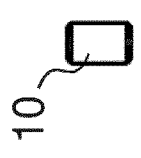
FIG. 7 shows a network node according to embodiments herein.
Figure 7:
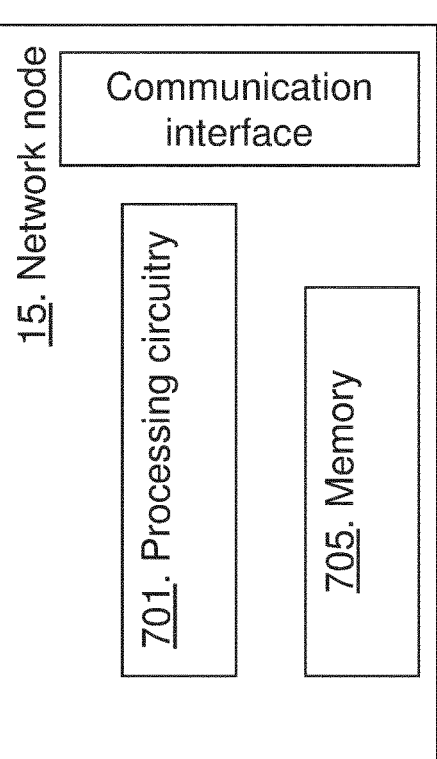
Figure 7:
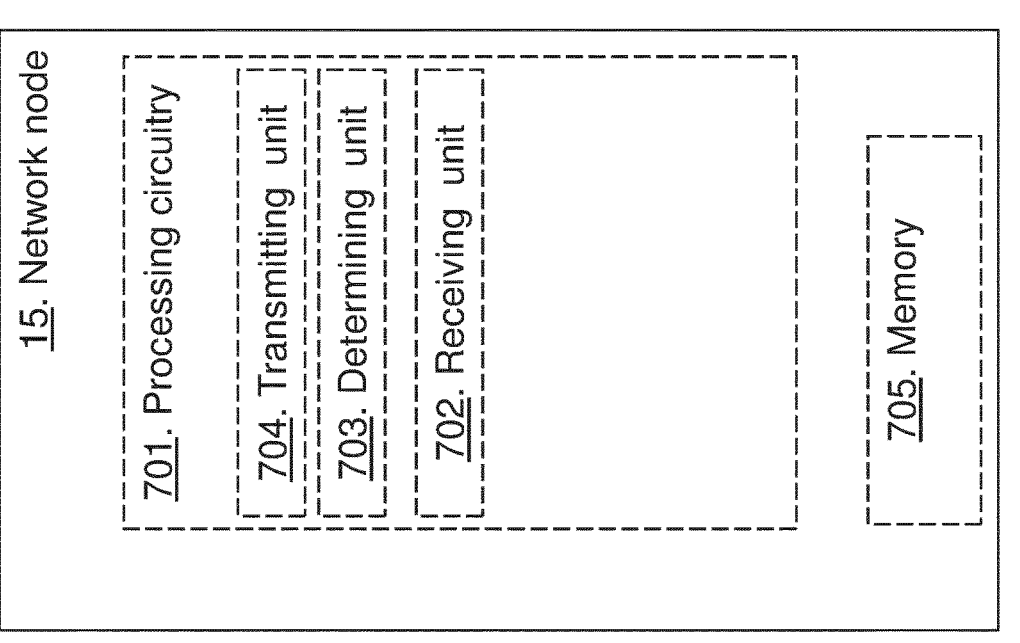
Figure 7:
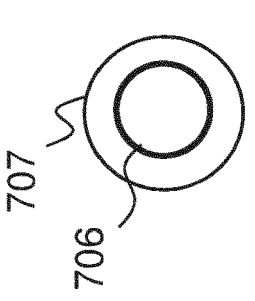

FIG. 7 is a block diagram depicting the network node, in two embodiments, for handling communication of the UE in the wireless communication network 1 according to embodiments herein.

The network node 15 may comprise processing circuitry 701, e.g. one or more processors, configured to perform the methods herein.

The network node 15 may comprise a receiving unit 702, e.g. a receiver or a transceiver. The network node 15, the processing circuitry 701 and/or the receiving unit 702 is configured to receive the request from the radio network node 12 of the first RAN, for handing over communication of the UE to the second RAN, e.g. the second radio network node 13.

The network node 15 may comprise a determining unit 703. The network node 15, the processing circuitry 701 and/or the determining unit 703 is configured to determine to accept or reject the handover of the UE based on whether the communication includes the emergency service or not, and on the identity associated to the second RAN and/or the first RAN, e.g. second PLMN ID.

The network node 15 may comprise a transmitting unit 704, e.g. a transmitter or a transceiver. The network node 15, the processing circuitry 701 and/or the transmitting unit 704 is configured to send the indication to the radio network node 12, wherein the indication indicates that HO to a certain PLMN, e.g. second PLMN ID, is restricted during emergency communication. The indication may comprise a MRL, wherein the MRL differentiates normal communication versus emergency communication and where an emergency entry in the MRL for emergency communications indicates that HO to a certain PLMN is restricted during emergency communication. The indication may comprise the configuration, wherein the configuration indicates that HO to a certain PLMN is restricted during emergency communication.

The network node 15, the processing circuitry 701 and/or the determining unit 703 may be configured to determine to reject the handover in case the communication is including an emergency call and the second RAN i.e. the second radio network node 13, is associated to a different PLMN than the first RAN and/or is associated to a different PLMN of a different operator than the first RAN. The different PLMN may be on a blacklist of PLMNs, or not on a whitelist of PLMNs.

The network node 15, the processing circuitry 701 and/or the determining unit 703 may be configured to reject the handover by sending back the indication to the radio network node 12 indicating the reason for the rejection to prevent further handover attempts.

The network node 15, the processing circuitry 701 and/or the receiving unit 702 may be configured to receive configuration indicating the blacklist of PLMNs for which handover of emergency calls is restricted or the whitelist of PLMNs for which handover of emergency calls is allowed.

The network node 15 further comprises a memory 705. The memory comprises one or more units to be used to store data on, such as indications, strengths or qualities, grants, messages, execution conditions, user data, reconfiguration, configurations, scheduling information, timers, applications to perform the methods disclosed herein when being executed, and similar. Thus, the network node may comprise the processing circuitry and the memory, said memory comprising instructions executable by said processing circuitry whereby said network node is operative to perform the methods herein. The network node comprises a communication interface comprising transmitter, receiver, transceiver and/or one or more antennas.

The methods according to the embodiments described herein for the network node are respectively implemented by means of e.g. a computer program product 706 or a computer program product, comprising instructions, i.e., software code portions, which, when executed on at least one processor, cause the at least one processor to carry out the actions described herein, as performed by the network node 15. The computer program product 706 may be stored on a computer-readable storage medium 707, e.g. a universal serial bus (USB) stick, a disc or similar. The computer-readable storage medium 707, having stored thereon the computer program product, may comprise the instructions which, when executed on at least one processor, cause the at least one processor to carry out the actions described herein, as performed by the network node 15. In some embodiments, the computer-readable storage medium may be a non-transitory or transitory computer-readable storage medium.

In some embodiments a more general term "network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), gateways, transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However, the embodiments are applicable to any RAT or multi-RAT systems, where the UE receives and/or transmit signals (e.g. data) e.g. NR frequency division duplex (FDD)/time division duplex (TDD), LTE FDD/TDD, Wi-Fi, WLAN, etc.

As will be readily understood by those familiar with communications design, that function means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 8:
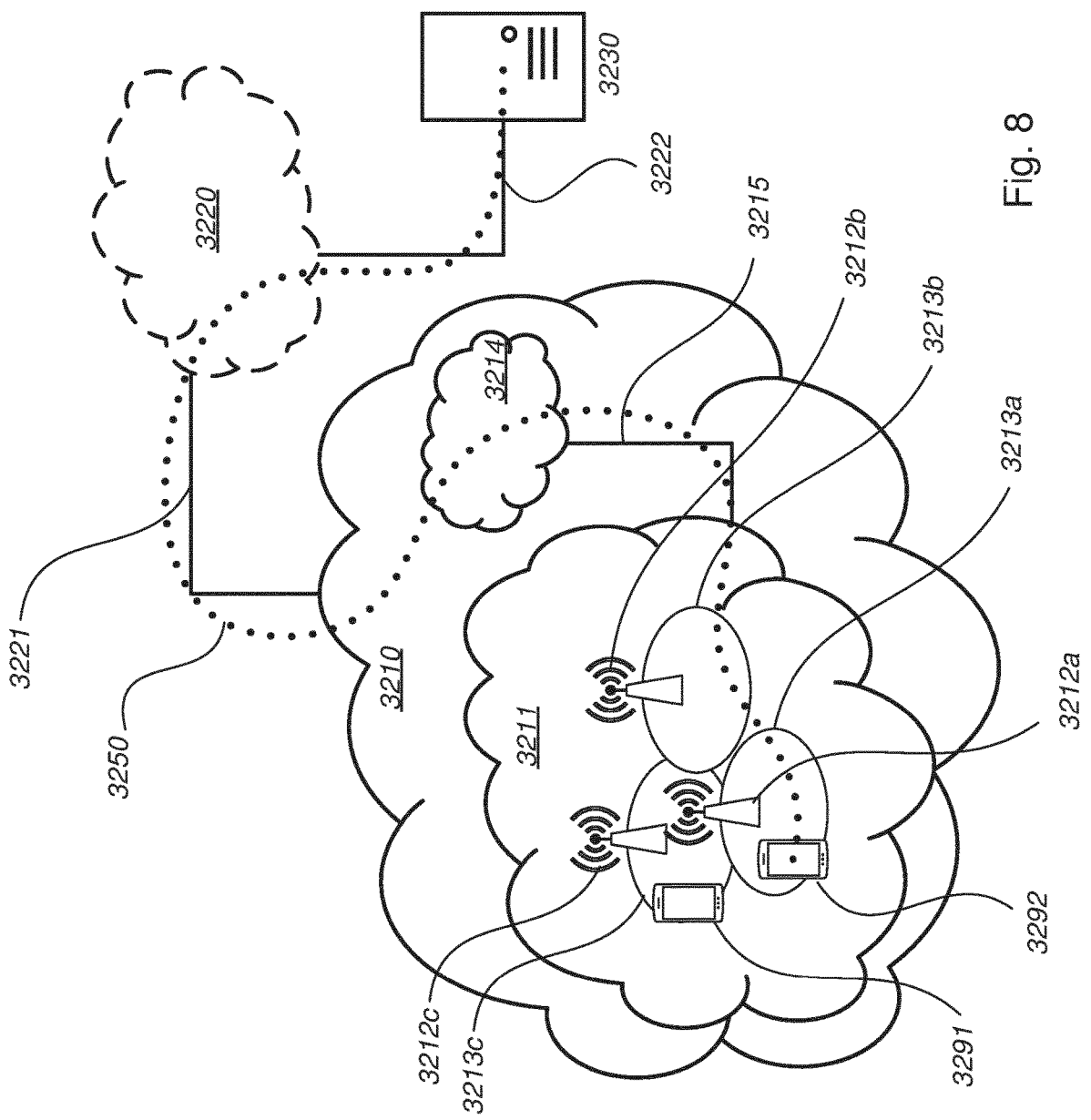
FIG. 8 shows a telecommunication network connected via an intermediate network to a host computer in accordance with some embodiments.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown)

adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
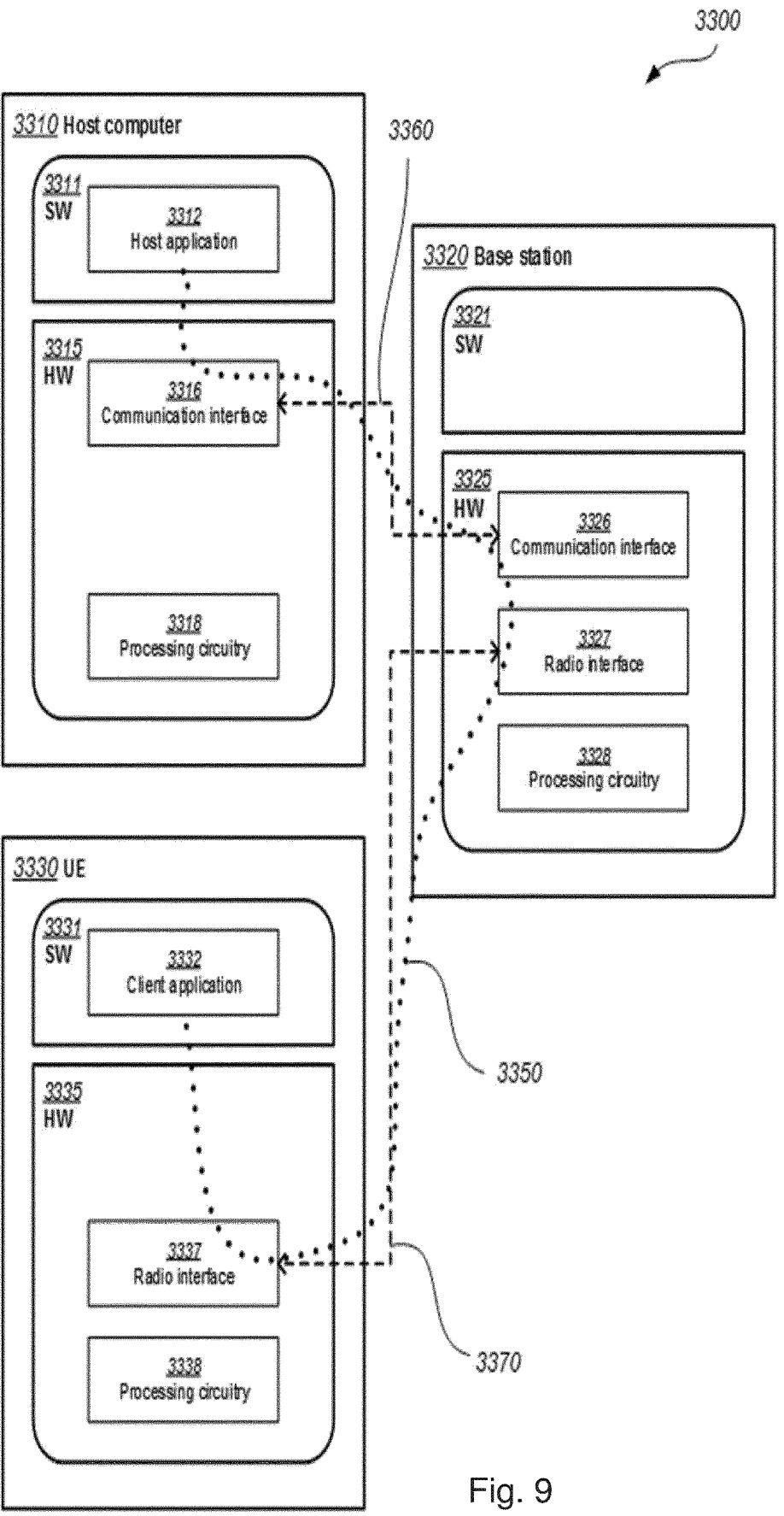
FIG. 9 shows a host computer communicating via a base station with a user equipment over a partially wireless connection in accordance with some embodiments.

It is noted that the host computer 3310, base station 3320 and UE 3330 illustrated in FIG. 9 may be identical to the host computer 3230, one of the base stations 3212*a*, 3212*b*, 3212*c* and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may avoid dropping emergency calls during roaming and thereby provide benefits such as improved user experience and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 10:
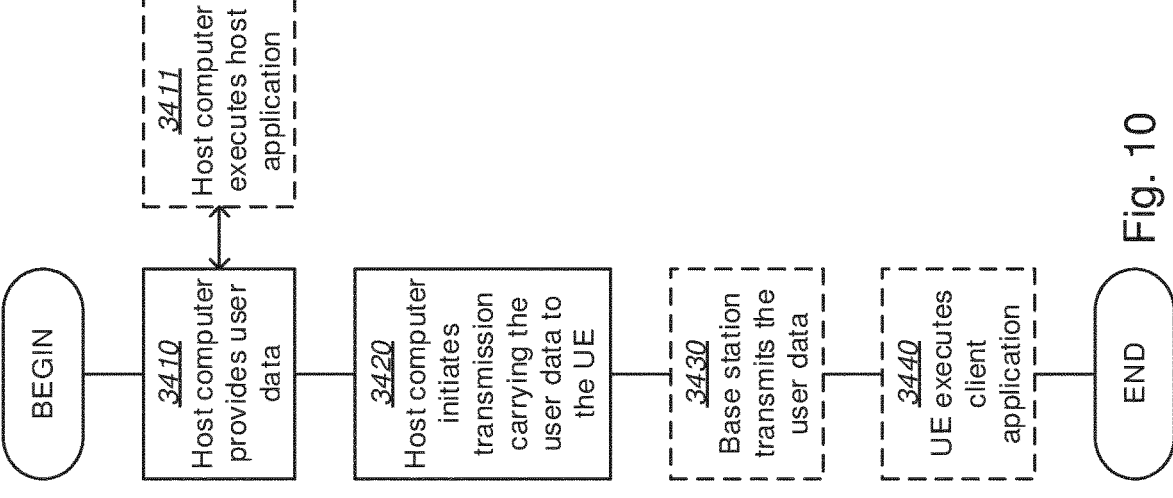
FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 11:
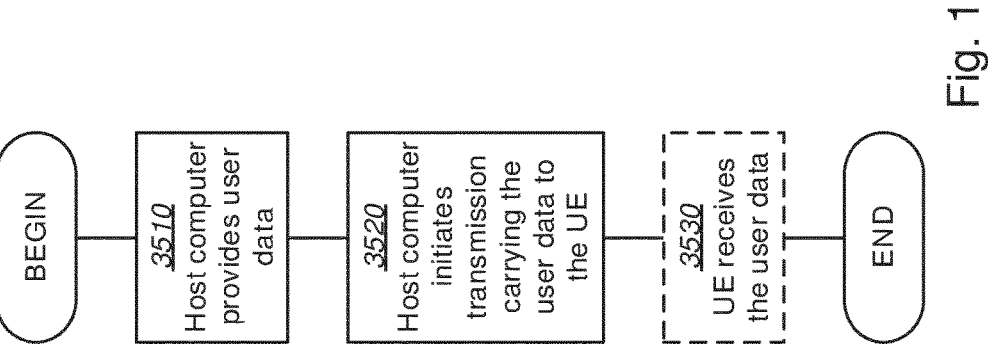
FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 12:
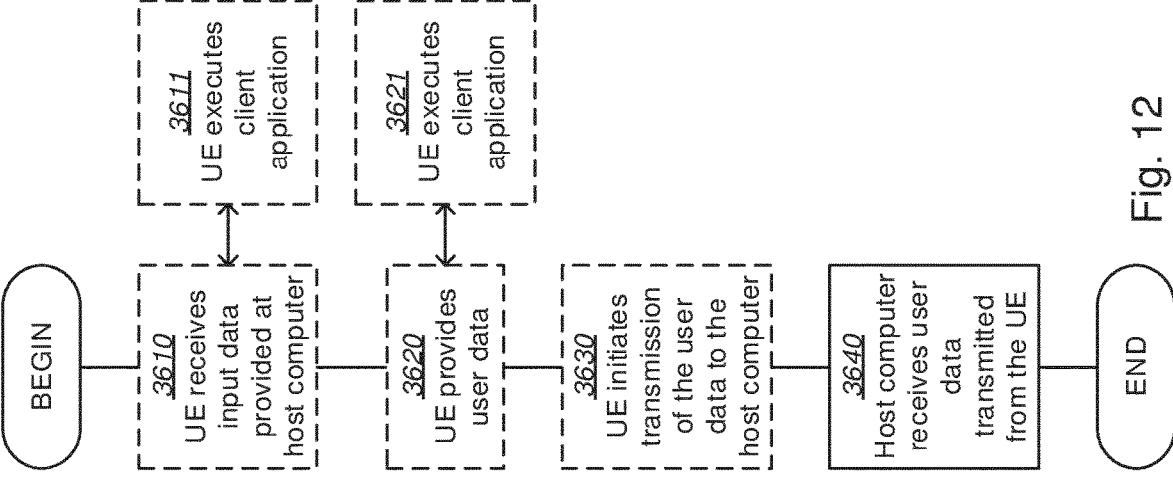
FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 13:
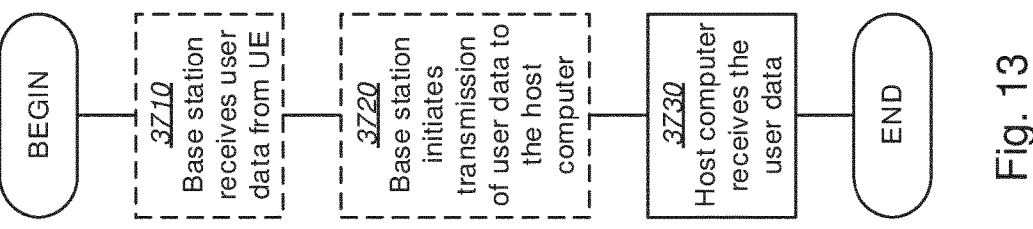
FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviation Explanation

3GPP 3rd Generation Partnership Project
5G 5th Generation

5GS 5G System
5GC 5G Core network
CHO Conditional Handover
CR Change Request
DAPS Dual Active Protocol Stack
DRB Data Radio Bearer
E-UTRAN Evolved Universal Terrestrial Access Network
gNB 5G Node B
HO Handover
LTE Long-term Evolution
NG The interface/reference point between the RAN and
the CN in 5G/NR.
NG-C
The control plane part of NG (between a gNB and an
AMF).
The user plane part of NG (between a gNB and a UPF).
Next Generation Radio Access Network
NG-U
NG-RAN
NR New Radio
PDCP Packet Data Convergence Protocol
PDU Protocol Data Unit
RAN Radio Access Network
RB Radio Bearer
RLC Radio Link Control
ROHC Robust Header Compression
RRC Radio Resource Control
SDU Service Data Unit
SGW Serving Gateway
SN Sequence Number
TS Technical Specification
UE User Equipment
UL Uplink
UPF User Plane Function
Xn The interface/reference point between two gNBs

REFERENCES

[1] 3GPP TS 22.261 v. 17.0.0 Service requirements for the
5G system; Stage 1 (Release 17)
[2] 3GPP TS 23.501 v.16.3.0 System Architecture for the 5G
System (5GS); Stage 2 (Release 16)
[3] 3GPP TS 23.502 v.16.3.0 Technical Specification Group
Services and System Aspects; Procedures for the 5G
System; Stage 2 (Release 16), v16.3.0

The invention claimed is:

1. A method performed by a radio network node for handling communication of a user equipment ("UE") in a wireless communication network, the method comprising:
determining to avoid initiation of a process for handing over ("HO") communication of the UE from the radio network node of a first radio access network ("RAN") to a second RAN when the communication includes an emergency service based on an identity associated to the second RAN indicating that the second RAN is a public land mobile network ("PLMN") restricted during emergency communication; and
subsequent to determining to avoid initiation of the process for HO the communication, communicating additional communications with the UE,
wherein determining to avoid initiation of the process comprises determining to avoid initiation of the process when the communication includes an emergency call based on the second RAN being associated with a different PLMN than the first RAN and is associated to a different PLMN of a different operator than the first RAN.

2. The method of claim 1, wherein the different PLMN is on a blacklist of PLMNs.
3. The method of claim 1, further comprising:
receiving a mobility restriction list ("MRL"),
wherein the MRL differentiates normal communications versus emergency communications where an emergency entry in the MRL for emergency communications indicates that HO to a certain PLMN is restricted during emergency communication, and
wherein determining to avoid initiation of the process comprises determining to avoid initiation of the process based on the MRL.
4. The method of claim 1, further comprising:
receiving configuration to avoid initiation of HO of emergency communication when second RAN is the public land mobile network ("PLMN") and an emergency call is ongoing.
5. The method of claim 1, further comprising:
receiving an indication from the first RAN or the second RAN indicating a reason for the rejection to prevent further handover attempts.
6. The method of claim 1, further comprising:
communicating the communication with the UE; and
determining that the communication of the UE includes the emergency service.
7. The method of claim 1, wherein the different PLMN is not on a whitelist of PLMNs.
8. A radio network node for handling communication of a user equipment ("UE") in a wireless communication network, the radio network node comprising:
processing circuitry; and
memory coupled to the processing circuitry and having instructions stored therein that are executable by the processing circuitry to cause the radio network node to perform operations comprising:
determining to avoid initiation of a process for handing over ("HO") communication of the UE from the radio network node of a first radio access network ("RAN") to a second RAN when the communication includes an emergency service based on an identity associated to the second RAN indicating that the second RAN is a public land mobile network ("PLMN") restricted during emergency communication; and
subsequent to determining to avoid initiation of the process for HO the communication, communicating additional communications with the UE,
wherein determining to avoid initiation of the process comprises determining to avoid initiation of the process when the communication includes an emergency call based on the second RAN being associated with a different PLMN than the first RAN and is associated to a different PLMN of a different operator than the first RAN.
9. The radio network node of claim 8, wherein the different PLMN is on a blacklist of PLMNs.
10. The radio network node of claim 8, the operations further comprising:
receiving a mobility restriction list ("MRL"),
wherein the MRL differentiates normal communications versus emergency communications where an emergency entry in the MRL for emergency communications indicates that HO to a certain PLMN is restricted during emergency communication, and
wherein determining to avoid initiation of the process comprises determining to avoid initiation of the process based on the MRL.

11. The radio network node of claim 8, the operations further comprising:

receiving configuration to avoid initiation of HO of emergency communication when second RAN is the PLMN and an emergency call is ongoing.

12. The radio network node of claim 8, the operations further comprising:

receiving an indication from the first RAN or the second RAN indicating a reason for the rejection to prevent further handover attempts.

13. The radio network node of claim 8, the operations further comprising:

communicating the communication with the UE; and determining that the communication of the UE includes the emergency service.

14. The radio network node of claim 8, wherein the different PLMN is not on a whitelist of PLMNs.

15. A non-transitory computer readable medium having instructions stored therein that are executable by processing circuitry of a radio network node to cause the radio network node to perform operations for handling communication of a user equipment ("UE") in a wireless communication network, the operations comprising:

determining to avoid initiation of a process for handing over ("HO") communication of the UE from the radio network node of a first radio access network ("RAN") to a second RAN when the communication includes an emergency service based on an identity associated to the second RAN indicating that the second RAN is a public land mobile network ("PLMN") restricted during emergency communication; and subsequent to determining to avoid initiation of the process for HO the communication, communicating additional communications with the UE, wherein determining to avoid initiation of the process comprises determining to avoid initiation of the process when the communication includes an emergency call based on the second RAN being associated with a different PLMN than the first RAN and is associated to a different PLMN of a different operator than the first RAN.

16. The non-transitory computer readable medium of claim 15, wherein the different PLMN is on a blacklist of PLMNs and/or not on a whitelist of PLMNs.

17. The non-transitory computer readable medium of claim 15, the operations further comprising:

receiving a mobility restriction list ("MRL"), wherein the MRL differentiates normal communications versus emergency communications where an emergency entry in the MRL for emergency communications indicates that HO to a certain PLMN is restricted during emergency communication, and wherein determining to avoid initiation of the process comprises determining to avoid initiation of the process based on the MRL.

18. The non-transitory computer readable medium of claim 15, the operations further comprising:

receiving configuration to avoid initiation of HO of emergency communication when second RAN is the PLMN and an emergency call is ongoing.

19. The non-transitory computer readable medium of claim 15, the operations further comprising:

receiving an indication from the first RAN or the second RAN indicating a reason for the rejection to prevent further handover attempts.

20. The non-transitory computer readable medium of claim 15, the operations further comprising:

communicating the communication with the UE; and determining that the communication of the UE includes the emergency service.

* * * * *